United States Patent [19]

Jones

[11] Patent Number: 5,638,401

[45] Date of Patent: Jun. 10, 1997

[54] METHOD AND APPARATUS FOR GENERATING PLURAL QUADRATURE MODULATED CARRIERS

[75] Inventor: Mark A. Jones, Forest, Va.

[73] Assignee: Ericsson Inc., Research Triangle Park, N.C.

[21] Appl. No.: 381,409

[22] Filed: Jan. 31, 1995

[51] Int. Cl.$^6$ .................................................. H04L 27/36
[52] U.S. Cl. ............................ 375/298; 375/308; 455/102; 332/103
[58] Field of Search ........................... 375/295, 298, 375/308, 261; 455/102; 332/108, 103

[56] References Cited

U.S. PATENT DOCUMENTS

| | | | |
|---|---|---|---|
| 3,623,105 | 11/1971 | Kamen | 455/102 |
| 3,783,385 | 1/1974 | Dunn et al. . | |
| 4,348,757 | 9/1982 | Richardson . | |
| 4,490,684 | 12/1984 | Epsom et al. . | |
| 4,554,672 | 11/1985 | Masamura et al. . | |
| 4,812,850 | 3/1989 | Gunton et al. . | |
| 4,814,730 | 3/1989 | Via et al. . | |
| 4,870,374 | 9/1989 | Harris . | |
| 4,914,651 | 4/1990 | Lusignan . | |
| 5,222,103 | 6/1993 | Gross | 375/281 |
| 5,313,174 | 5/1994 | Edwards . | |
| 5,373,265 | 12/1994 | Davis et al. | 455/102 |
| 5,463,355 | 10/1995 | Halloran | 375/308 |

FOREIGN PATENT DOCUMENTS

| | | |
|---|---|---|
| 0613264 | 8/1994 | European Pat. Off. . |
| 9512261 | 5/1995 | WIPO . |

OTHER PUBLICATIONS

*1994 IEEE Globecom, Conference Record* (Cat. No. 94CH34025), San Francisco, CA, USA, 28 Nov. –Dec. 1994, ISBN 0–7803–1820–X, 1994, New York, NY, USA. IEEE, USA, pp. 420–424, vol. 1, XP000488585, Yamada et al., "A digitized group modulator using simple fractional sampling".

*Primary Examiner*—Stephen Chin
*Assistant Examiner*—T. Ghebretinsae
*Attorney, Agent, or Firm*—Nixon & Vanderhye P.C.

[57] ABSTRACT

A transmitter includes a combiner for combining plural data signal sets into a single set of data signals. An I/Q modulator modulates the single sets of data signals onto for example an intermediate frequency (IF) carrier signal. A frequency upconverter converts the frequency of the IF signal to a radio frequency signal which, when amplified in a power amplifier, is transmitted via antenna. Using the present invention, plural sets of quadrature modulated signals separated in frequency are transmitted on a single RF carrier rather than on two carriers.

17 Claims, 3 Drawing Sheets

SPECTRUM OF I1
OR Q1

SPECTRUM OF I2
OR Q2

SPECTRUM OF I' OR Q'

SPECTRUM OF OUTPUT

METHOD AND APPARATUS FOR GENERATING PLURAL QUADRATURE MODULATED CARRIERS

FIELD OF THE INVENTION

The present invention relates to quadrature modulation, and in particular, an apparatus and a method for generating plural quadrature modulated carriers.

BACKGROUND AND SUMMARY OF THE INVENTION

Quadrature modulation is used in digital modulation techniques such as quadrature phase shift keying (QPSK), quadrature amplitude modulation (QAM), differential quadrature phase shift keying (DQPSK), etc. In systems where quadrature modulation is employed to transmit digitized voice or data, each data carrier, i.e., each I/Q modulated carrier, is created with its own set of radio frequency (RF) infrastructure including an I/Q modulator, a frequency synthesizer, a frequency up converter, and an RF power amplifier.

In many communication contexts, such as mobile radio communications, additional channel capacity is obtained by making more efficient use of the existing frequency spectrum allocated per communications channel. For example, in mobile radio communications, each communications channel is traditionally allocated 25 KHz of bandwidth. However, in newer digital mobile radio systems, bandwidth per channel is decreased so that two channels can be accommodated within the same 25 KHz, i.e., each channel occupies 12.5 KHz. With this more efficient use of bandwidth, two data carriers are transmitted where there once was only a single data carrier.

One approach to generate these two data carriers is for each carrier to be processed using their own dedicated RF infrastructure as shown in the transmitter for example in FIG. 1. Thus, a first set of data signals (I1, Q1) would be modulated in I/Q data modulator 12 using a first local oscillator frequency $F_{101}$, typically an intermediate frequency (IF), generated by a first frequency synthesizer 14. The output of the I/Q modulator 12 is upconverted in mixer 16 using RF frequency $F_{rf1}$ also generated by frequency synthesizer 14 before being amplified in RF power amplifier 18. The second set of data signals (I2, Q2) would be modulated in a second I/Q data modulator 20 using local oscillator frequency $F_{102}$ generated by a second frequency synthesizer 22. The output signal from second I/Q modulator 20 would then be upconverted in a second mixer 24 using another RF frequency $F_{rf2}$, the output of the mixer 24 being suitably amplified in a second RF power amplifier 26. The two amplified signals would then be transmitted over a single antenna using combiner 28.

Thus, in order for the transmitter in FIG. 1 to generate the two data carriers containing data signals (I1, Q1) and (I2, Q2), two sets of RF transmitter components such as two I/Q modulators, two frequency synthesizers, two RF power amplifiers, etc., are required. These RF components are expensive and/or bulky and consume considerable power. Thus, upgrading existing radios, such as base stations, to adapt to narrower channel spacing is a significant undertaking in terms of cost and hardware reconfiguration.

What is desired is a way in which two (or more) quadrature data carriers may be simply and efficiently combined before being modulated and transmitted so that there would be no need to duplicate expensive, bulky, and power consuming hardware components. It is therefore an object of the present invention to provide a transmitter which effectively combines two (or more) quadrature data signals before modulation in a single I/Q modulator.

For example, the present invention includes a combiner for combining plural data signals into a combined data signal. An I/Q modulator modulates the combined data signal which is then amplified in a single power amplifier and transmitted over an antenna. The combiner combines various components of the first and second data signals. The I/Q modulator may be a conventional I/Q modulator that quadrature modulates signals onto a single frequency carrier.

In one embodiment, the combiner in accordance with the present invention determines the sum and difference of various I/Q components of the two data signals. Summed outputs are modulated and phased shifted by 90° using a low frequency sinusoidal signal and a mixer. Differenced outputs are mixed with the low frequency in-phase sinusoid, i.e., zero phase shift. The summed and differenced components respectively are summed to generate a single set of data signals (I', Q'). The I' signal is mixed in the I/Q modulator with a local oscillator intermediate frequency (IF), and the Q' component is mixed using the same local oscillator IF frequency shifted by 90°. The IF in-phase and quadrature components are combined in an RF combiner and output to the single RF mixer and power amplifier components. Alternatively, a high frequency I/Q modulator could be used thereby eliminating the need for the RF mixer. The single RF output, therefore, contains two independent quadrature carriers.

The present invention also includes a method comprising the stops of converting two data signals each having first and second components into one data signal having a first and second component, and modulating the first and second components in an I/Q modulator. A single output of the I/Q modulator includes two independent quadrature modulated signals separated in frequency. The converting stop may further include the stops of summing certain ones of the first and second components; differencing certain ones of the first and second components, mixing summed differenced components with a low frequency signal; and combining the mixed signals to produce the one complex signal. As a result, the two independent quadrature modulated signals are separated by twice the frequency of the low frequency signal.

Thus, the present invention is advantageous in that a radio transmitter may be constructed to transmit two independent quadrature signals using only one modulator, one frequency synthesizer, and one power amplifier. These and other features and objects of this invention will become more apparent by reference to the following detailed description in conjunction with the accompanying drawings.

DETAILED DESCRIPTION OF THE DRAWINGS

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
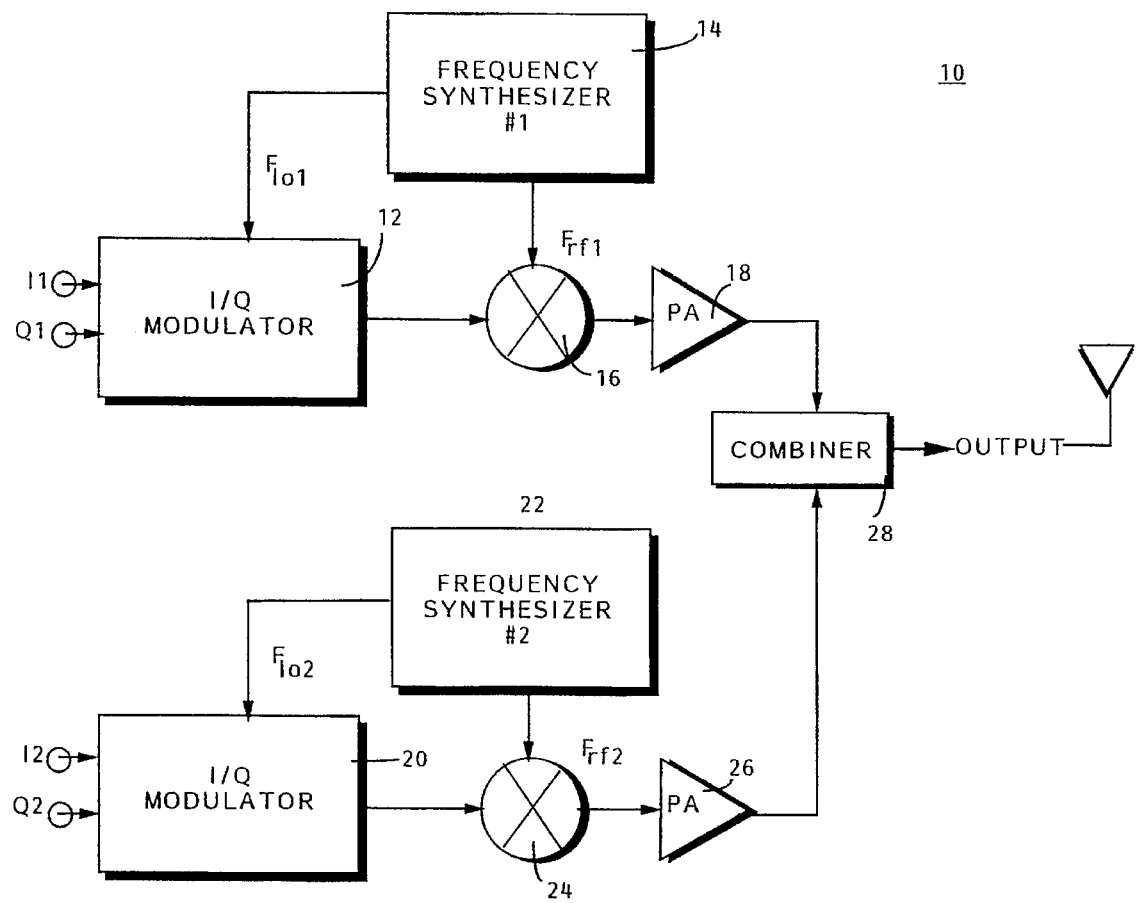
FIG. 1 is a function block diagram of two duplicate I/Q modulation signal paths each with its own dedicated set of transmitter circuitry.
Figure 2:
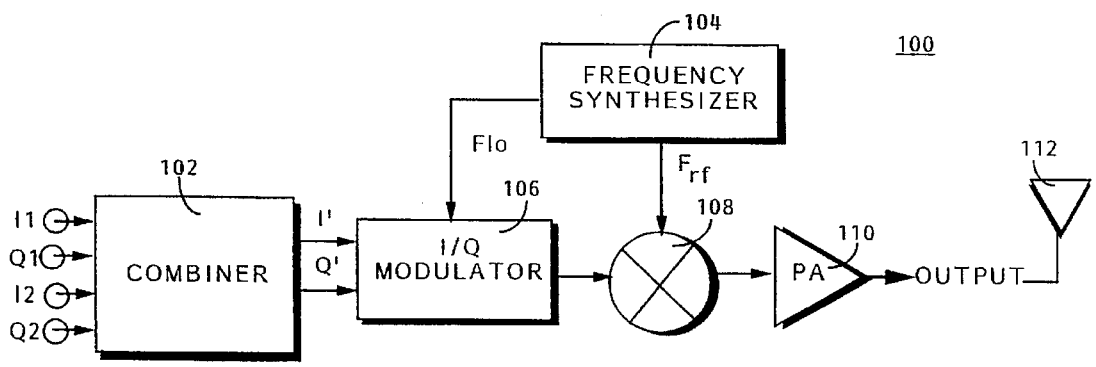
FIG. 2 is a function block diagram in accordance with the present invention.

FIG. 2 is a function block diagram of a transmitter 100 utilizing the present invention. A combiner 102 receives plural data signals. In FIG. 2 for example, first data signals have a first component (I1) and a second component (Q1) and second data signals have components I2 and Q2. Data signals (I1 and Q1) and (I2 and Q2) are for example baseband signals with no definite phase. When modulated by a quadrature modulator, these I and Q signals are 90° out of phase. For convenience, the various components of the baseband data signals are distinguished using I/Q labels (I1, Q1, I2, Q2), and in this example, each set of data signals (I1, Q1) and (I2, Q2) referred to as a set of I/Q data signals.

Combiner 102 combines various ones of the baseband data signal components and mixes them with a low frequency sinusoid. The mixed signals are combined to generate outputs I', Q' which are fed to a conventional I/Q modulator 106 where they are combined with quadrature intermediate frequency (IF) carrier waves ($F_{lo}$) generated by a single frequency synthesizer 104. The IF modulated signals are combined and frequency upconverted in RF mixer 108 to a radio frequency $R_{rf}$ also generated by frequency synthesizer 104. The RF mixer 108, however, is optional. Using a high frequency I/Q modulator, for example, the I' and Q' signals can be modulated directly onto an RF frequency carrier. The output of single RF mixer 108 (or a high frequency I/Q modulator) is then amplified in a single RF power amplifier 110 and transmitted via an antenna. The single output from the RF mixer (or from the high frequency I/Q modulator) contains two independent quadrature carriers.

Thus, the present invention uses existing transmitter infrastructure already in place for transmitting a single quadrature carrier to transmit two sets of quadratured modulated signals. In other words, the same frequency synthesizer, I/Q modulator, RF mixer (optional), RF power amplifier, and antenna transmit two quadrature data signals instead of one. By eliminating an extra set of circuitry required to transmit two complex data signals, the present invention reduces size, expense, and current drain of the radio transmitter. Consequently, radios using the present invention may be adapted to more efficient use of bandwidth (narrower channel spacing) without having to add substantial new hardware. Thus, radio upgrades to accommodate narrower channel spacing can be performed easily and at low cost compared to adding a new set of hardware. Another significant advantage of the present invention is that specialized hardware/software is not required at the receiver to demodulate and retrieve the two original data signals (I1, Q1) and (I2, Q2).

Figure 3:
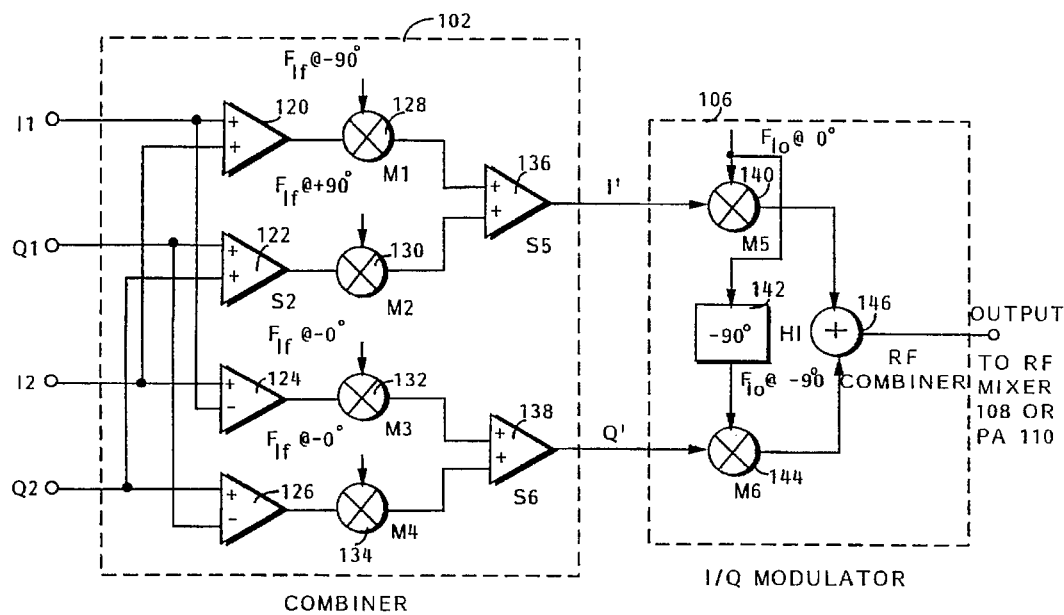
FIG. 3 is a function block diagram of the present invention in accordance with a first embodiment.

A first example embodiment of the present invention is now described in conjunction with the function block diagram illustrated in FIG. 3. The combiner 102 includes four combining circuits 120, 122, 124, and 126. Combiner (summers) circuits 122 and 124 sum the "I" data signal components I1 and I2 and "Q" data signal components Q1 and Q2, respectively. Combiner circuits (difference amplifiers) 120 and 126 take the difference between I1 and I2 and Q1 and Q2 signals, respectively. The outputs of combiner circuits 120 and 122 are applied to corresponding mixers 128 and 130. A low frequency carrier/sinusoid ($F_{if}$), generated for example by an audio frequency generator (not shown), is applied with as another input to each mixer. Specifically, the low frequency sinusoidal is applied, lagging by 90°, to mixer 132 and, leading by 90°, to mixer 130. The low frequency sinusoid may be for example in the range of 500 Hz–100 KHz. The outputs of amplifiers 124 and 126 are applied to mixers 132 and 134, respectively. The low frequency sinusoidal carrier signal is applied to mixers 132 and 134. The outputs of mixers 128 and 130 are summed in summer 136 to generate a first combined signal which has been labelled I' for convenience since it is ultimately input into the I port of I/Q modulator 106. Similarly, the outputs of mixers 132 and 134 are summed in summer 138 the output of which is labelled Q' because it is applied to the Q port of I/Q modulator 106.

I/Q modulator 106 may be a conventional I/Q modulator as shown in FIG. 3. The r input signal from combiner 102 and local oscillator IF carrier $F_{lo}$ are mixed in mixer 140. The local oscillator IF carrier $F_{lo}$ is shifted in phase by 90° using, for example, a conventional Hilbert transformer 142 to generate a local oscillator IF carrier lagging in phase by 90° which is applied to mixer 144 along with the Q' output from combiner 102. The outputs from IF mixers 140 and 144 are summed together in a conventional RF combiner 146 to provide a single output that is ultimately applied to RF mixer 108 (shown in FIG. 2) or directly to the PA if a high frequency I/Q modulator is used.

The function of the combiner 102 in conjunction with I/Q modulator 106 may be demonstrated mathematically as follows with $\Omega_{lo}=2\pi \cdot F_{lo}$ and $\Omega_{if}=2\pi \cdot F_{if}$ $$\begin{aligned}
\text{Output} &= [I_2 - I_1]\sin\omega_{lo}t \sin\omega_{if}t + [Q_1 + Q_2]\sin\omega_{lo}t\sin(\omega_{if}t + 90°) + \\
&\quad [I_1 + I_2]\sin(\omega_{lo}t - 90°)\sin(\omega_{if}t - 90°) + [Q_2 - Q_1]\sin(\omega_{lo}t - 90°)\sin\omega_{if}t
\end{aligned} \quad (1)$$

$$\begin{aligned}
&= 1/2[I_2 - I_2][\cos(\omega_{lo}t - \omega_{if}t) - \cos(\omega_{lo}t + \omega_{if}t)] + \\
&\quad 1/2(Q_1 + Q_2)[\cos(\omega_{lo}t - \omega_{if}t - 90°) - \cos(\omega_{lo}t + \omega_{if}t + 90°)] + \\
&\quad 1/2[I_1 + I_2][\cos(\omega_{lo}t - 90° - \omega_{if}t + 90°) - \cos(\omega_{lo}t - 90° + \omega_{if}t - 90°)] + \\
&\quad 1/2[Q_2 - Q_1][\cos(\omega_{lo}t - 90° - \omega_{if}t) - \cos(\omega_{lo}t - 90° + \omega_{if}t)]
\end{aligned} \quad (2)$$

$$\begin{aligned}
&= \cos(\omega_{lo}t + \omega_{if}t)[-1/2I_2 + 1/2I_1 + 1/2I_1 + 1/2I_2] + \\
&\quad \cos(\omega_{lo}t + \omega_{if}t - 90°)[1/2Q_1 + 1/2Q_2 - 1/2Q_2 + 1/2Q_1] + \\
&\quad \cos(\omega_{lo}t - \omega_{if}t)[1/2I_2 - 1/2I_1 + 1/2I_1 + 1/2I_2] + \\
&\quad \cos(\omega_{lo}t - \omega_{if}t - 90°)[1/2Q_1 + 1/2Q_2 + 1/2Q_2 - 1/2Q_1]
\end{aligned} \quad (3)$$

$$\begin{aligned}
&= I_1 \cos[(\omega_{lo} + \omega_{if})t] + \\
&\quad Q_1 \cos a[(\omega_{lo} + \omega_{if})t - 90°] + \\
&\quad I_2 \cos[(\omega_{lo} - \omega_{if})t] + \\
&\quad Q_2 \cos[(\omega_{lo} - \omega_{if})t - 90°]
\end{aligned} \quad (4)$$

Figure 5A:
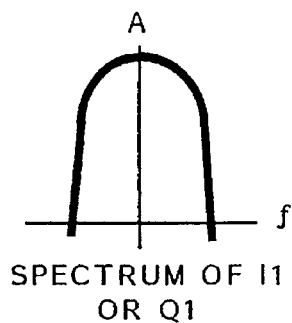
FIGS. 5(a)–5(c) are graphs illustrating operation of the present invention.
Figure 5A:
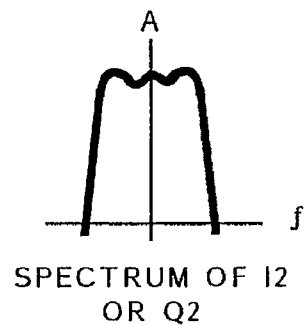
Figure 5B:
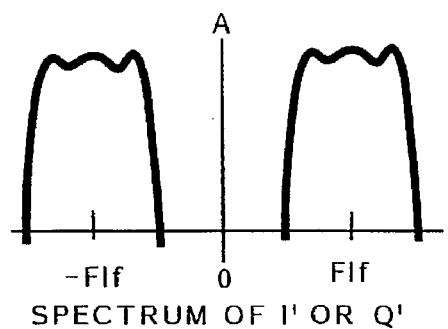

FIG. 5(a) shows example frequency spectrum graphs [amplitude (A) vs. frequency (f)] of the data signals $I_1$ or $Q_1$, and $I_2$ or $Q_2$. FIG. 5(b) illustrates the spectrum of combined signals I' or Q'. The output of the I/Q modulator 106 is illustrated in FIG. 5(c).

Figure 5C:
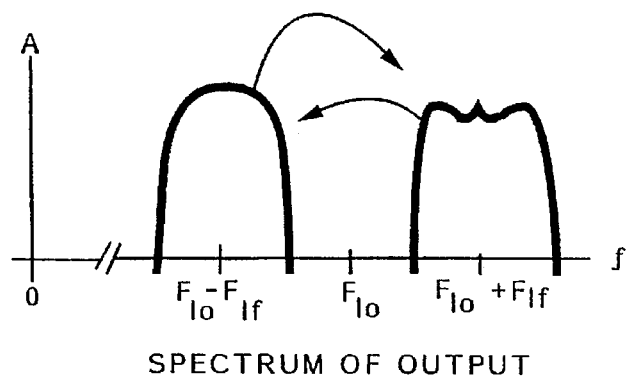

As shown in FIG. 5(c) and demonstrated mathematically above in equations (1)–(4), when the combined signals are processed by single I/Q modulator 106, a single output is generated that includes two independent I/Q modulated carriers separated in frequency by $2F_{if}$. This separation in frequency is significant because it permits filtering/selection of each of the signals using conventional filters found in existing receivers. From the received and filtered signals, the original data signals $I_1$, $Q_1$ and $I_2$, $Q_2$ may be retrieved using conventional I/Q demodulators. This extraction of original data signals is, as described above, made possible because the signals are separated in frequency and because I/Q modulation/demodulation is a linear operation that permits relatively simple reconstruction of the original signals. Thus, the data signals (I1, Q1) are retrieved by a radio received tuned to $(F_{lo}+F_{if})$ and the data signals (I2, Q2) by radio receiver tuned to $(F_{lo}-F_{if})$, respectively.

Figure 4:
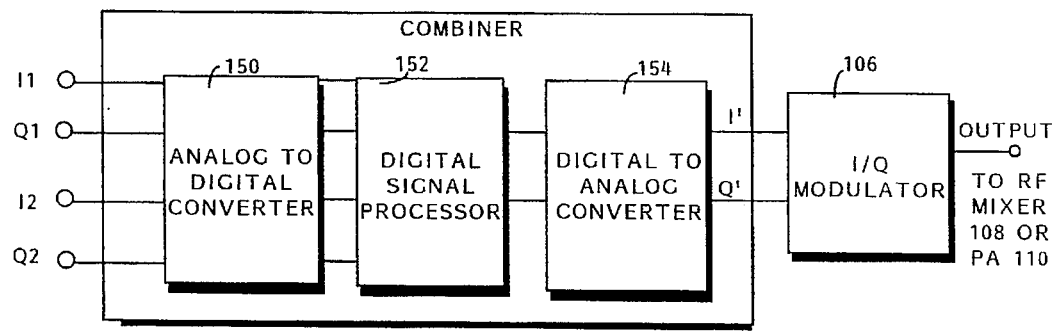
FIG. 4 is a function block diagram of the present invention in accordance with a second embodiment.

A second embodiment of the present invention is now described in conjunction with FIG. 4. The second and perhaps preferable embodiment in this era of digital processing uses digital signal processor (DSP) 154 to perform the functions of combiner 102. The data signals $(I_1,Q_1)$ and $(I_2,Q_2)$ are first converted into digital format via analog to digital converter 150 before further processing by digital signal processor 152. The DSP 152 then performs the various algebraic combinations of I and Q signals. The various low frequency signals $F_{if}$, $(F_{if}-90°)$, and $(F_{if}+90°)$ are preferably generated by the DSP 152 numerically using for example a standard lookup table to minimize additional physical components. Note that the functions of the analog to digital converter 150 and digital to analog converter 154 also could be performed by the digital signal processor 152 if desired.

The I' and Q' signals output via digital analog converter 154 are generated by the digital signal processor 152 in accordance with the following equations:

$$I'=[\sin(2\pi f_{if}t)][I_2-I_1]+[\sin(2\pi f_{if}t+90°)][Q_1+Q_2] \quad (5)$$

$$Q'=[\sin(2\pi f_{if}t)][Q_2-Q_1]+[\sin(2\pi f_{if}t-90°)][I_1+I_2] \quad (6)$$

where $f_{if}$=frequency of low frequency sinusoid in Hz.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus comprising:

a combiner for combining at least two independent sets of data signals each independent set having plural components into a single set of data signals having plural components including a pair of summers for summing components of the at least two independent sets of data signals, and a pair of differencers for taking the difference of components of the at least two independent sets of data signals;

a modulator for modulating the single data signal onto an intermediate frequency signal; and a frequency converter for converting the intermediate frequency signal to a radio frequency signal.

2. The apparatus of claim 1, wherein the modulator is an I/Q modulator, the apparatus further comprising:

a power amplifier for amplifying the radio frequency signal, and an antenna for transmitting the amplified radio frequency signal.

3. The apparatus of claim 1, wherein the combiner further includes:

first and second mixers for mixing the outputs of the pair of differencers with a first signal, and third and fourth mixers for mixing the outputs of the pair of summers with a second signal.

4. The apparatus of claim 3, wherein the first and second signals have the same frequency in the range of 500 Hz–100 kHz.

5. The apparatus of claim 4, wherein the first and second signals are out of phase by 90 degrees.

6. The apparatus of claim 3, wherein the combiner further includes:

means for summing the outputs of the first and second mixers to generate a first input to the I/Q modulator, and means for summing the outputs of the third and fourth mixers to generate a second input to the I/Q modulator.

7. The apparatus in claim 1, wherein the intermediate frequency signal includes two independent modulated carriers separated in frequency.

8. An apparatus comprising:

a combiner for combining at least two independent sets of data signals each independent set having plural components into a single set of data signals having plural components a modulator for modulating the single data signal onto an intermediate frequency signal; and a frequency converter for converting the intermediate frequency signal to a radio frequency signal, wherein the combiner includes a digital signal processor that sums components of the at least two independent sets of data signals and difference components of the at least two independent sets of data signals.

9. A data modulator for modulating first and second independent sets of signals, each independent set of data signals having first and second components, comprising:

a combiner for summing components of the first and second independent sets of data signals into a first combined signal and differencing components of the first and second independent sets of data signals into a second combined signal, modulating the first and second combined signals with a low frequency signal, and summing certain ones of the modulated signals to provide a first combiner output signal and a second combiner output signal; and an I/Q modulator for I/Q modulating the first and second combiner output signals.

10. The data modulator in claim 9, wherein the I/Q modulator produces a single output including two independent quadrature modulated carriers separated in frequency.

11. The data modulator in claim 10, wherein the two independent quadrature modulated carriers are separated by twice the frequency of the low frequency signal.

12. A data modulator in accordance with claim 9, wherein the combiner mixes differenced components with a first signal and the summed components with a second signal having different phases.

13. A method comprising the steps of:

converting two data signals each having a first and a second component including:
  summing certain ones of the first and second components of the two data signals;
  differencing certain ones of the first and second components of the two data signals;
  mixing summed and differenced components with a low frequency signal; and
  combining the mixed signals to provide the one data signal, and modulating the first and second components of the one data signal in an I/Q modulator, wherein an output of the I/Q modulator includes two sets of quadrature modulated signals separated in frequency.

14. The method in claim 13, further comprising the stops of:

converting the output of the I/Q modulator to an RF frequency in an RF mixer;

amplifying an output signal of the RF mixer using a power amplifier; and transmitting the amplified signal.

15. The method in claim 14, wherein only one I/Q modulator, one RF mixer, and one power amplifier are used to generator the amplified signal.

16. The method in claim 13, wherein the two independent I/Q modulated signals are separated by twice the frequency of the low frequency signal.

17. The method in accordance with claim 13, wherein the mixing step includes mixing the summed and differenced components with the low frequency signal having a first phase for the summed components and a second different phase for the difference components.

* * * * *